United States Patent Office 2,696,835
Patented Dec. 14, 1954

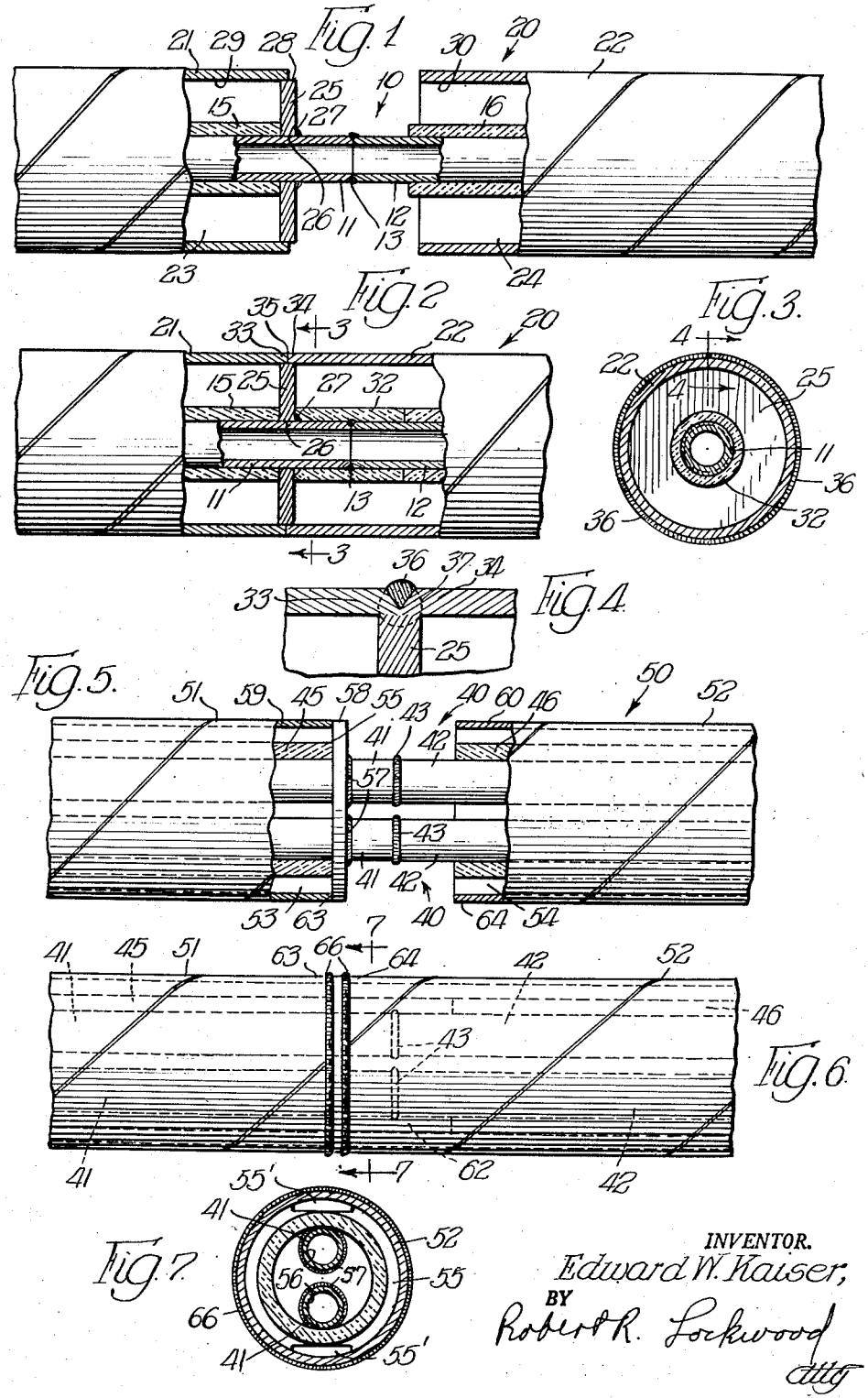

2,696,835

CONDUIT CONSTRUCTION

Edward W. Kaiser, Chicago, Ill.

Application November 4, 1950, Serial No. 194,172

The terminal portion of the term of the patent subsequent to April 15, 1969, has been disclaimed 3 Claims. (Cl. 138—87)

This invention relates, generally, to conduit constructions, and it has particular relation to the anchoring of an inner fluid conducting pipe to an outer spaced pipe in order to take care of expansion and contraction of the former.

When a fluid, such as steam, is to flow from a boiler to a load, it is desirable to keep transmission losses to a minimum. For this reason the pipe which carries the steam is provided with a covering of insulation. Loss in transmission is further reduced by enclosing the insulated pipe in an outer pipe with an air space therebetween. Because of expansion and contraction of the inner steam carrying pipe due to temperature change, it is desirable to control the movement thereof relative to the outer pipe. For this purpose the inner pipe is anchored to the outer pipe at one or more suitable points, such as at points several hundred feet apart.

Among the objects of this invention are: To provide for anchoring the inner pipe to the outer pipe in a manner which shall be simple and efficient in operation and which may be readily and economically accomplished; to employ an anchor plate for this purpose and to secure it integrally to the inner and outer pipes so that substantially no relative movement thereof can take place with respect to the plane of the anchor plate; to form the outer pipe in sections a pair of the ends of which meet at the periphery of the anchor plate and to which they are joined, as by welding; and to extend the anchor plate no further than the inner surface of the outer pipe and to join it to the overlying ends of the pipe sections by a single weld.

Other objects of this invention will, in part, be obvious and in part appear hereinafter.

This invention is disclosed in the embodiments thereof shown in the accompanying drawing and it comprises the features of construction, combination of elements and arrangement of parts which will be exemplified in the constructions hereinafter set forth and the scope of the application of which will be indicated in the appended claims.

For a more complete understanding of the nature and scope of this invention, reference can be had to the following detailed description, taken together with the accompanying drawing, in which:

Figure 1 is a view, partly in elevation and partly in section, showing a conduit construction manufactured in accordance with this invention, the illustration being that of the parts prior to complete assembly;

Figure 2 is a view, similar to Figure 1, and showing the sections of the outer pipe in position for welding to the anchor plate;

Figure 3 is a detail sectional view taken generally along the line 3—3 of Figure 2 and showing the completed construction with the welding bead laid down;

Figure 4 is a fragmentary sectional view, at an enlarged scale, taken generally along the line 4—4 of Figure 3 and illustrating the manner in which the anchor plate is joined integrally to the ends of the pipe sections forming the outer pipe;

Figure 5 is a view, similar to Figure 1, illustrating the use of the present invention in conjunction with two inner pipes and showing how the anchor plate can be secured to the ends of the adjacent outer pipe sections in a different manner;

Figure 6 is a view similar to Figure 5 but showing the completed assembly; and

Figure 7 is a detail sectional view taken generally along the line 7—7 of Figure 6.

Referring now particularly to Figures 1, 2 and 3 of the drawing, it will be observed that the reference character 10 designates, generally, an inner pipe, preferably formed of steel, through which the fluid, such as steam, is to flow. The inner pipe 10 includes inner pipe sections 11 and 12, which are of suitable length for handling, and they are joined by welding 13 in the form of a bead laid down by arc or gas welding. Surrounding the inner pipe sections 11 and 12 are sleeves of insulation 15 and 16 which are employed for minimizing the heat loss from the inner pipe 10.

With a view to further minimizing heat loss from the inner pipe 10, it is located in an outer pipe that is indicated, generally, at 20. The outer pipe 20 is formed of steel and preferably has a uniform inner and outer diameter. The particular outer pipe construction is illustrated as being a spirally welded pipe. This is mentioned and shown for illustrative purposes only since other types of pipe can be employed without departing from this invention.

It will be noted that the outer pipe 20 comprises outer pipe sections 21 and 22 which are of appropriate length to facilitate ready handling. Spaces 23 and 24 are provided between the outer surfaces of the sleeves of insulation 15 and 16 and the inner surfaces of the outer pipe sections 21 and 22. As indicated above they provide additional insulation and reduce further the heat loss from the inner pipe 10.

As previously pointed out it is desirable to control the movement of the inner pipe 10 as a result of its expansion and contraction due to temperature change. For this purpose provision is made for securely anchoring the inner pipe 10 to the outer pipe 20 at certain spaced points along a run of the pipe. At these points, then, there is no relative movement between the inner pipe 10 and the outer pipe 20. Since the sections 21 and 22 constituting the outer pipe 20 are relatively strong in compression and tension, since they are formed as indicated of steel pipe, provision is made in accordance with this invention for anchoring the inner pipe 10 solely to the outer pipe 20.

In accordance with this invention the anchoring of the inner pipe 10 to the outer pipe 20 is accomplished by means of an anchor plate 25 which is illustrated in the drawing as comprising an annular member formed of a single piece of steel. If desired it can be formed in two parts so that generally semicircular annular members are provided which can be joined along their meeting edges. If desired the anchor plate 25 can be apertured, as shown in the embodiment of the invention illustrated in Figure 7, in order to place the spaces 23 and 24 on opposite sides in communication with each other. The anchor plate 25 is provided with a central opening 26 for receiving the inner pipe section 11. As indicated at 27 the anchor plate 25 is welded to the inner pipe section 11 so that, in effect, the anchor plate 25 constitutes an integral part of the inner pipe 10.

In the embodiment of the invention illustrated in Figures 1, 2 and 3 of the drawing, the anchor plate 25 has such an external diameter that the outer periphery 28 thereof interfits with the inner surfaces 29 and 30 of the outer pipe sections 21 and 22. In other words the outer diameter of the anchor plate 25 is substantially equal to the inner diameter of the outer pipe 20.

Prior to the movement of the outer pipe section 22 to the position shown in Figure 2, a sleeve of insulation 32 is positioned around the bared ends of the inner pipe sections 11 and 12. In order to facilitate this the sleeve may be formed in two sections or it may be a cylindrical member with a longitudinal slit either of which constructions permits it to be slipped over the bare ends of the inner pipe sections 11 and 12 where it can be secured in position by any suitable means.

As shown in Figure 2 the outer pipe section 22 is moved toward the outer pipe section 21 so that the ends 33 and 34 thereof overlie the periphery 28 of the anchor plate 25. They abut as indicated at 35 generally centrally of the anchor plate 25.

Next the ends 33 and 34 of the pipe sections 21 and 22 are welded to the anchor plate 25 so that the integral construction shown in Figure 4 is obtained. For this purpose the welding operation is carried out under such conditions that sufficient heat is applied and weld metal added to completely fuse together the juxtaposed ends 33 and 34 and the adjacent outer portion of the anchor plate 25. The welding is indicated at 36 in the form of a bead which projects only slightly above the outer surface of the outer pipe 20. However, the welding zone is indicated by the broken line 37 and cross hatching which shows that the ends 33 and 34 of the outer pipe sections 21 and 22 are joined integrally with the anchor plate 25.

Assuming now that the anchor plate 25 has been secured integrally to the inner pipe 10 and the outer pipe 20 in the manner described and that the inner pipe 10 tends to move to the right, as viewed in Figure 2, as a result of expansion or contraction, then the resulting stress is transmitted through the anchor plate 25 to place the outer pipe section 22 in compression and the outer pipe section 21 in tension. Because of the size and strength of the outer pipe 20 substantially no actual translatory movement of the anchor plate 25 takes place. When the tendency for movement of the inner pipe 12 is in the opposite direction, then the outer pipe section 21 is placed in compression and the outer pipe section 22 is in tension.

In Figures 5, 6 and 7 of the drawings, another embodiment of the invention is illustrated. As there shown two inner pipes, indicated, generally, at 40, are employed for conducting the fluid in the heated condition. Each of the inner pipes 40 is made up of inner pipe sections 41 and 42 which are joined together by welding as indicated at 43. A single sleeve of insulation 45 and 46 surrounds both of the inner pipes 40 to reduce heat loss therefrom. If desired individual sleeves of insulation can be provided. The inner pipes 40 are located within an outer pipe 50 which is made up of outer pipe sections 51 and 52. The outer pipe 50 is preferably of the same construction as the outer pipe 20 previously described. Likewise the inner pipes 40 are constructed so as to have the same characteristics as the inner pipe 10. The diameter of the outer pipe 50 is such that spaces 53 and 54 are provided between the inner surface thereof and the outer surface of the sleeves of insulation 45 and 46.

It is desirable to anchor the two inner pipes 40 to the outer pipe 50 for the reasons outlined hereinbefore. For this purpose an anchor plate 55 is employed. As shown in Figure 7 it may be apertured as indicated at 55' so as to place the spaces 53 and 54 on opposite sides in communication with each other.

The anchor plate 55 is preferably formed of steel and it has openings 56 for receiving therethrough the inner pipe sections 41. As indicated at 57 they may be welded to the anchor plate 55 so as to make the same integral therewith.

The diameter of the anchor plate 55 is such that its outer periphery 58 coincides substantially with the outer surface 59 and 60 of the outer pipe sections 51 and 52. In other words the diameter of the anchor plate 55 is the same as the outer diameter of the outer pipe 50.

Prior to bringing the outer pipe section 52 to a position where its abuts the anchor plate 55, a sleeve of insulation 62, Figure 6, is added around the bared ends of the pipe sections 41 and 42. This completes the insulation thereof and extends the sleeve of insulation 46 up to the anchor plate 55.

As shown in Figure 6 the ends 63 and 64 of the outer pipe sections 51 and 52 abut opposite sides of the anchor plate 55 so that two joints are provided. These are welded as indicated at 66 by the provision of two beads of weld metal so as to provide the desired integral construction of the anchor plate 55 with the outer pipe sections 51 and 52.

The reaction of the inner pipes 40 on expansion or contraction with respect to the outer pipe 50 will be the same as described hereinbefore with respect to the inner pipe 10 and the outer pipe 20. It will be understood that the anchor plate 55 can be constructed as shown in Figure 1 and also that the anchor plate 25 can be arranged as illustrated in Figure 5 for the anchor plate 55 if desired.

Since certain further changes can be made in the foregoing constructions and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. In a conduit system in which a fluid, such as steam, is transmitted from a boiler or the like to a load at a remote location, in combination, an inner fluid conducting pipe for interconnecting said boiler and load and through which the fluid can flow as aforesaid, an outer pipe of substantially uniform inner and outer diameter from end to end surrounding and spaced from said inner pipe and coextensive therewith and comprising a pair of pipe sections in end-to-end relation intermediate said boiler and load, and means for anchoring the portion of said inner pipe at the junction between said pipe sections against endwise movement relative thereto comprising an anchor plate surrounding and fastened to said inner pipe and extending transversely of said outer pipe no further than the outer surface thereof and welded to the jutxaposed ends of said pipe sections with the resulting weld metal constituting the sole connecting means between said anchor plate and said pipe sections, said anchor plate acting to transmit stress from said inner pipe incident to endwise expansion or contraction thereof to said outer pipe to place one of said pipe sections in compression and the other in tension or vice versa depending upon the endwise direction in which stress is applied to said anchor plate by said inner pipe, there being no stress transmitted by said anchor plate externally of said outer pipe and the latter having sufficient columnar strength by itself to resist without buckling the stress applied thereto resulting from endwise expansion and contraction of said inner pipe.

2. In a conduit system in which a fluid, such as steam, is tranmitted from a boiler or the like to a load at a remote location, in combination, an inner fluid conducting pipe for interconnecting said boiler and load and through which the fluid can flow as aforesaid, an outer pipe surrounding and spaced from said inner pipe and coextensive therewith and comprising a pair of pipe sections in end-to-end relation intermediate said boiler and load, and means for anchoring the portion of said inner pipe at the junction between said pipe sections against endwise movement relative thereto comprising an anchor plate surrounding and fastened to said inner pipe and extending transversely only to the inner surface of said outer pipe and fastened integrally thereto and acting to transmit stress from said inner pipe incident to endwise expansion or contraction thereof to said outer pipe to place one of said pipe sections in compression and the other in tension or vice versa depending upon the endwise direction in which stress is applied to said anchor plate by said inner pipe, there being no stress transmitted by said anchor plate externally of said outer pipe and the latter having sufficient columnar strength by itself to resist without buckling the stress applied thereto resulting from endwise expansion and contraction of said inner pipe.

3. In a conduit system in which a fluid, such as steam, is transmitted from a boiler or the like to a load at a remote location, in combination, an inner fluid conducting pipe for interconnecting said boiler and load and through which the fluid can flow as aforesaid, an outer pipe surrounding and spaced from said inner pipe and coextensive therewith and comprising a pair of pipe sections in end-to-end relation intermediate said boiler and load, and means for anchoring the portion of said inner pipe at the junction between said pipe sections against endwise movement relative thereto comprising an anchor plate welded to said inner pipe and extending transversely thereof to the inner surface of said outer pipe at the end of one of said pipe sections, and weld means joining said pipe sections at said junction therebetween and the periphery of said anchor plate to said outer pipe, said anchor plate acting to transmit stress from said inner pipe incident to endwise expansion or contraction thereof to said outer pipe to place one of said pipe sections in compression and the other in tension or vice versa depending upon the endwise direction in which stress is applied to said anchor plate by said inner pipe, there being no stress transmitted by said anchor plate externally of said outer pipe and the latter having sufficient columnar strength by itself to resist without buckling the stress applied thereto resulting from endwise expansion and contraction of said inner pipe.

References Cited in the file of this patent

UNITED STATES PATENTS

| Number | Name | Date |
|---|---|---|
| 797,027 | Tilden | Aug. 15, 1905 |
| 1,559,156 | Bullock | Oct. 27, 1925 |
| 2,330,966 | Gottwald et al. | Oct. 5, 1943 |
| 2,360,067 | McLeish | Oct. 10, 1944 |
| 2,419,278 | Motsenbocker | Apr. 22, 1947 |
| 2,423,213 | Weber | July 1, 1947 |
| 2,451,145 | Baker et al. | Oct. 12, 1948 |
| 2,451,146 | Baker et al. | Oct. 12, 1948 |
| 2,475,635 | Parsons | July 12, 1949 |
| 2,592,574 | Kaiser | Apr. 15, 1952 |